(12) United States Patent
Suzuki et al.

(10) Patent No.: US 11,105,693 B2
(45) Date of Patent: Aug. 31, 2021

(54) TORQUE SENSOR

(71) Applicant: NIDEC COPAL ELECTRONICS CORPORATION, Tokyo (JP)

(72) Inventors: Takashi Suzuki, Sano (JP); Takao Ikeda, Sano (JP); Takashi Kanai, Sano (JP); Takayuki Endo, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 195 days.

(21) Appl. No.: 16/394,442

(22) Filed: Apr. 25, 2019

(65) Prior Publication Data

US 2019/0310146 A1 Oct. 10, 2019

Related U.S. Application Data

(63) Continuation of application No. PCT/JP2017/035634, filed on Sep. 29, 2017.

(30) Foreign Application Priority Data

Dec. 7, 2016 (JP) .............................. JP2016237779

(51) Int. Cl.
*G01L 3/00* (2006.01)
*G01L 3/10* (2006.01)
*G01L 3/14* (2006.01)

(52) U.S. Cl.
CPC .............. *G01L 3/10* (2013.01); *G01L 3/1457* (2013.01)

(58) Field of Classification Search
CPC .................................. G01L 3/10; G01L 3/1457
(Continued)

(56) References Cited

U.S. PATENT DOCUMENTS 4,763,531 A * 8/1988 Dietrich ................. G01L 5/161
 73/862.044
8,161,827 B2 * 4/2012 Kato ..................... G01L 3/1457
 73/862.044
(Continued)

FOREIGN PATENT DOCUMENTS

CN 1914493 2/2007
CN 101118194 2/2008
(Continued)

OTHER PUBLICATIONS

Office Action issued in Corresponding Japanese Application No. 2016-237779, dated Aug. 4, 2020.
(Continued)

*Primary Examiner* — Max H Noori
(74) *Attorney, Agent, or Firm* — Burris Law, PLLC

(57) ABSTRACT

A torque sensor includes a first region, a second region, a plurality of third regions connecting the first and second regions, a first strain generation part and a second strain generation part. The first strain generation part of which a first end is provided on the first region, and of which a first intermediate portion is provided on a second structure. The second strain generation part of which a third end is provided on the first region, of which a second intermediate portion is provided on the second region, and of which a fourth end is provided near a second end of the first strain generation part. A strain body provided with a resistor connects the second end of the first strain generation part and the fourth end of the second strain generation part.

6 Claims, 5 Drawing Sheets

(58) Field of Classification Search
USPC .................................................. 73/862.08
See application file for complete search history.

(56) References Cited

U.S. PATENT DOCUMENTS

| | | | |
|---|---|---|---|
| 2004/0007082 A1 | 1/2004 | Herbold | |
| 2013/0319135 A1* | 12/2013 | Okada | G01L 5/0076 73/862.043 |
| 2017/0153156 A1* | 6/2017 | Nitz | G01L 5/226 |
| 2019/0250051 A1* | 8/2019 | Suzuki | G01L 1/2237 |
| 2019/0275681 A1* | 9/2019 | Bohme | G01L 3/108 |
| 2019/0352978 A1* | 11/2019 | Gherardi | E21B 19/07 |
| 2020/0348194 A1* | 11/2020 | Endo | H01L 29/84 |

FOREIGN PATENT DOCUMENTS

| | | |
|---|---|---|
| CN | 102235926 | 11/2011 |
| CN | 102959377 | 3/2013 |
| CN | 104215372 | 12/2014 |
| JP | S47017484 | 9/1972 |
| JP | 2001304985 | 10/2001 |
| JP | 2010066181 | 3/2010 |
| JP | 2013096735 | 5/2013 |
| JP | 5640905 | 12/2014 |
| JP | 2015049209 | 3/2015 |

OTHER PUBLICATIONS

International Search Report for International Application PCT/JP2017/035634, dated Dec. 26, 2017.

Office Action issued in corresponding CN Application No. 201780068842.2, dated Jul. 10, 2020.

* cited by examiner

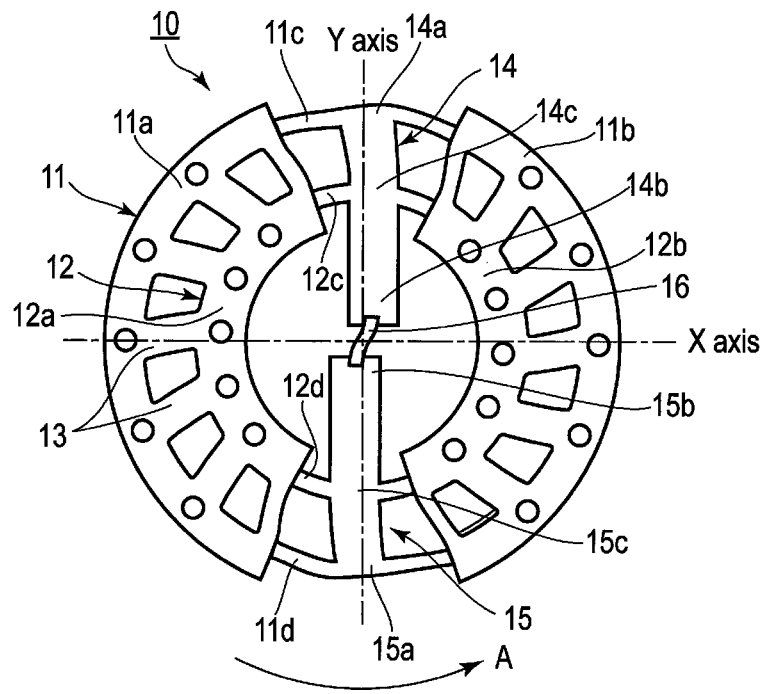
F I G. 5
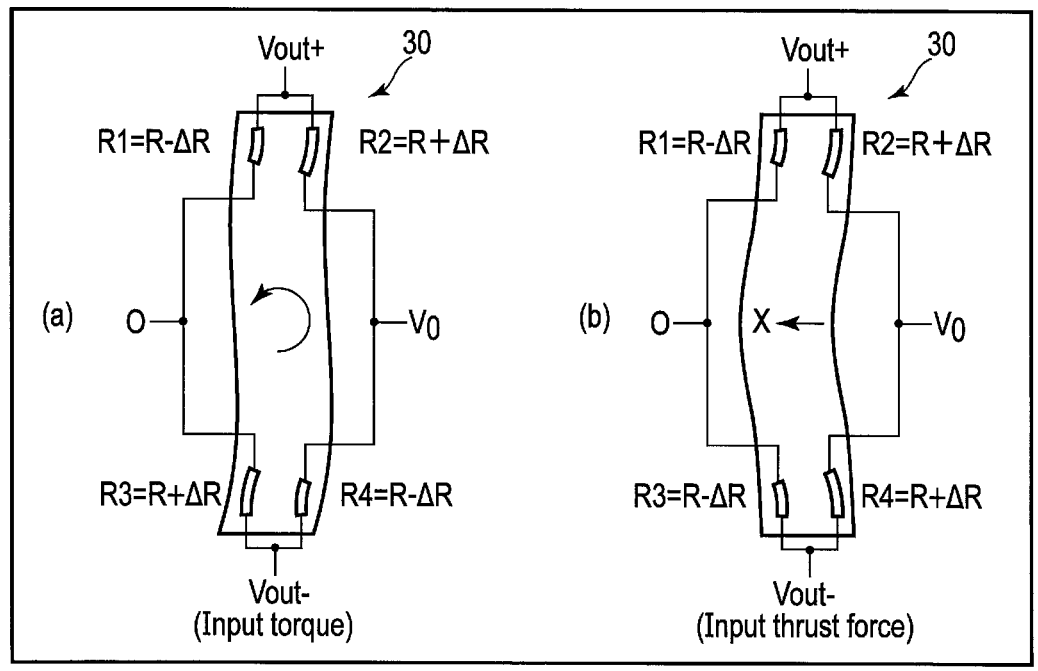
F I G. 6

|  | Execution of application of torque | Execution of application of thrust force | Give temperature variation ΔT to only gauges of R1 and R2 | R1 | R2 | R3 | R4 | Vout calculation results |
|---|---|---|---|---|---|---|---|---|
| (1) | — | — | — | $R$ | $R$ | $R$ | $R$ | 0 |
| (2) | ○ | — | — | $R-\Delta R$ | $R+\Delta R$ | $R+\Delta R$ | $R-\Delta R$ | $-\Delta R/R \cdot V_0$ |
| (3) | — | ○ | — | $R-\Delta R$ | $R+\Delta R$ | $R-\Delta R$ | $R+\Delta R$ | 0 |
| (4) | — | — | ○ | $R \cdot (1+\alpha \cdot \Delta T)$ | $R \cdot (1+\alpha \cdot \Delta T)$ | $R$ | $R$ | 0 |
| (5) | ○ | — | ○ | $(R-\Delta R) \cdot (1+\alpha \cdot \Delta T)$ | $R+\Delta R$ | $R+\Delta R$ | $R-\Delta R$ | $-\Delta R/R \cdot V_0$ |
| (6) | — | ○ | ○ | $(R-\Delta R) \cdot (1+\alpha \cdot \Delta T)$ | $R+\Delta R$ | $R-\Delta R$ | $R+\Delta R$ | 0 |

FIG. 7

TORQUE SENSOR

CROSS-REFERENCE TO RELATED APPLICATIONS

This application is a continuation of International Application No. PCT/JP2017/035634, filed on Sep. 29, 2017, which claims priority to and the benefit of JP 2016-237779 filed on Dec. 7, 2016. The disclosures of the above applications are incorporated herein by reference.

FIELD

The present disclosure relates to, for example, a torque sensor provided at a joint of a robot arm.

BACKGROUND

The statements in this section merely provide background information related to the present disclosure and may not constitute prior art.

The torque sensor of this type comprises a first structure to which a torque is applied, a second structure from which a torque is output, and a plurality of strain generation parts that connect the first structure and the second structure, and a strain sensor is disposed in these strain generation parts (see, for example, Patent Literature 1 (JP 2013-096735 A), Patent Literature 2 (JP 2015-049209 A), and Patent Literature 3 (JP 5640905 B)).

SUMMARY

In the torque sensor, it has been difficult to set the sensitivity and the allowable torque (maximum torque) of the strain sensor, or the mechanical strength of the torque sensor independently.

Embodiments of the present invention provide a torque sensor capable of independently setting the sensitivity and the allowable torque of the strain sensor or the mechanical strength of the torque sensor.

A torque sensor of the embodiments includes a first region, a second region, and a plurality of third regions connecting the first region and the second region, a torque to be measured being transmitted between the first region and the second region via the third region, and the torque sensor comprises a first strain generation part comprising a first end, a second end, and a first intermediate portion between the first end and the second end, the first end being provided on the first region, the first intermediate portion being provided on the second region, a second strain generation part comprising a third end, a fourth end, and a second intermediate portion between the third end and the fourth end, the third end being provided on the first region, the second intermediate portion being provided on the second region, the fourth end being arranged near the second end of the first strain generation part, and a strain body connecting the second end of the first strain generation part and the fourth end of the second strain generation part and being provided with a resistor.

The present invention can provide a torque sensor capable of independently setting the sensitivity and allowable torque of the strain sensor or the mechanical strength of the torque sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a view illustrating operations of the torque sensor according to the first embodiment.

FIG. 6 is views illustrating operations of a bridge circuit.

FIG. 7 is a table illustrating output voltages in different operation conditions of the bridge circuit.

DETAILED DESCRIPTION

Figure 1:
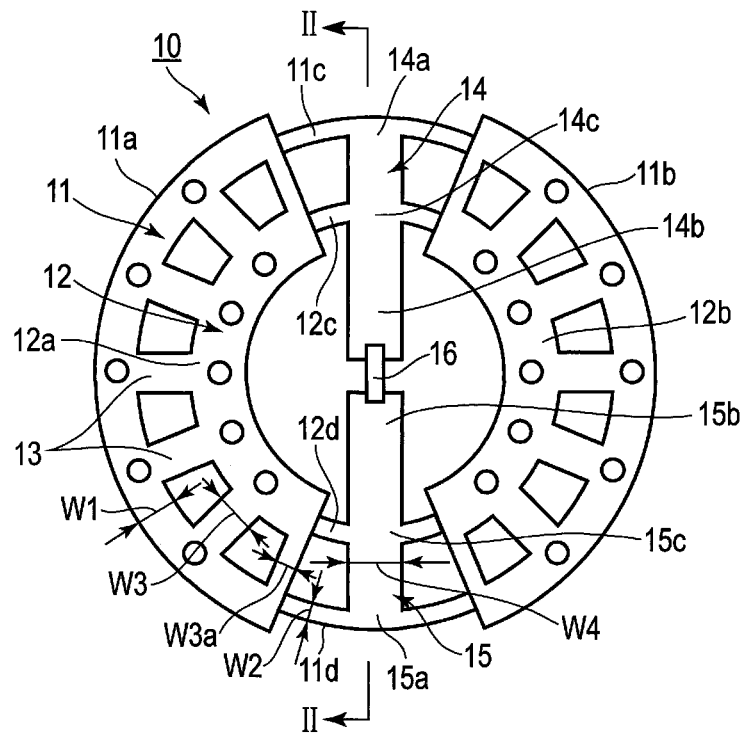
FIG. 1 is a plan view showing a torque sensor according to a first embodiment.

Embodiments will be described hereinafter with reference to the accompanying drawings. In the drawings, the same parts are denoted by the same reference numerals.

First Embodiment

Figure 2:
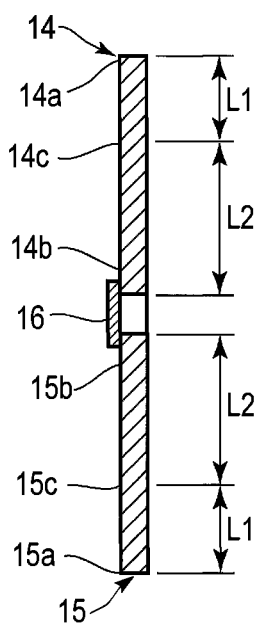
FIG. 2 is a cross-sectional view seen along line II-II of FIG. 1.

In FIG. 1 and FIG. 2, a torque sensor 10 comprises a first structure (first region) 11, a second structure (second region) 12, a plurality of beams (third regions) 13, a first strain generation part 14, and a second strain generation part 15.

The first structure 11 to which the torque is applied and the second structure 12 from which the torque is output are formed in an annular shape.

The first structure 11 comprises a first portion 11a and a second portion 11b which have an arcuate shape having a first width W1, and a third portion 11c and a fourth portion 11d which have an arcuate shape having a second width W2 smaller than the first width W1. The third portion 11c and the fourth portion 11d of the first structure 11 are arranged between the first portion 11a and the second portion 11b of the first structure 11.

The second structure 12 comprises a fifth portion 12a and a sixth portion 12b which have an arcuate shape, and a seventh portion 12c and an eighth portion 12d which have an arcuate shape. The seventh portion 12c and the eighth portion 12d of the second structure 12 are arranged between the fifth portion 12a and the sixth portion 12b of the second structure 12. The fifth portion 12a and the sixth portion 12b of the second structure 12 have, for example, the first width W1, similarly to the first structure 11, and the seventh portion 12c and the eighth portion 12d have the second width W2 smaller than the first width W1. The width of the fifth portion 12a, the sixth portion 12b, the seventh portion 12c, and the eighth portion 12d of the second structure 12 is not limited to this but can be varied.

The second structure 12 is disposed concentrically with the first structure 11, and the first portion 11a of the first structure 11 and the fifth portion 12a of the second structure 12, and the second portion 11b of the first structure 11 and the sixth portion 12b of the second structure 12 are connected by the plurality of beams 13 radially arranged.

A width W3 of the beams 13 is set to be, for example, smaller than the width W1 of the first portion 11a and the second portion 11b of the first structure 11 and the fifth portion 12a and the sixth portion 12b of the second structure 12, and larger than the width W2 of the third portion 11c and the fourth portion 11d of the first structure 11 and the seventh portion 12c and the eighth portion 12d of the second structure 12. The width W3 of the beams 13 is not limited to this but can be varied.

In addition, a width W3a of each of four portions adjacent to the third portion 11c and the fourth portion 11d of the first structure 11 and the seventh portion 12c and the eighth portion 12d of the second structure 12, of the beams 13, is set to be equal to the width W2 of the third portion 11c, the fourth portion 11d, the seventh portion 12c, and the eighth portion 12d.

The strength of the beams 13 is defined by the width of the beams 13 if the thickness of the beams 13 is assumed to be equal to the thickness of the first structure 11 and the second structure 12. A substantial rotation angle of the first structure 11 to the second structure 12 in accordance with the torque applied to the first structure 11 is determined by the strength of the plurality of beams 13.

The third portion 11c of the first structure 11 and the seventh portion 12c of the second structure 12 are connected by the first strain generation part 14. The first strain generation part 14 includes a first end 14a, a second end 14b, and an intermediate portion 14c between the first end 14a and the second end 14b, and the first end 14a is connected to the third portion 11c of the first structure 11, and the intermediate portion 14c is connected to the seventh portion 12c of the second structure 12. The second end 14b of the first strain generation part 14 is made to extend to an approximately central portion of the second structure 12.

The fourth portion 11d of the first structure 11 and the eighth portion 12d of the second structure 12 are connected by the second strain generation part 15. The second strain generation part 15 includes a first end 15a, a second end 15b, and an intermediate portion 15c between the first end 15a and the second end 15b, and the first end 15a is connected to the fourth portion 11d of the first structure 11, and the intermediate portion 15c is connected to the eighth portion 12d of the second structure 12. The second end 15b of the second strain generation part 15 is made to extend to an approximately central portion of the second structure 12, and is opposed to and spaced apart in a predetermined interval from the second end 14b of the first strain generation part 14.

The first strain generation part 14 and the second strain generation part 15 have a fourth width W4. The fourth width W4 is set to be, for example, larger than or equal to the first width W1. However, the fourth width is not limited to this but may be first width W1 or less and the second width W2 or more.

The first structure 11, the second structure 12, the plurality of beams 13, the first strain generation part 14, and the second strain generation part 15 are formed of, for example, metal, but can be formed by using materials other than metal if a mechanical strength can be sufficiently obtained to the applied torque.

In addition, the third portion 11c and the fourth portion 11d of the first structure 11, and the seventh portion 12c and the eighth portion 12d of the second structure 12, the first strain generation part 14, and the second strain generation part 15 may be formed separately from the first portion 11a and the second portion 11b of the first structure 11 and the fifth portion 12a and the sixth portion 12b of the second structure 12, and may be attached to the first portion 11a and the second portion 11b of the first structure 11 and the fifth portion 12a and the sixth portion 12b of the second structure 12.

As shown in FIG. 2, in the first strain generation part 14, a length L1 between the first end 14a and the intermediate portion 14c is set to be shorter than a length L2 between the intermediate portion 14c and the second end 14b. In the second strain generation part 15, the length L1 between the first end 15a and the intermediate portion 15c is set to be shorter than the length L2 between the intermediate portion 15c and the second end 15b.

The second end 14b of the first strain generation part 14 and the second end 15b of the second strain generation part 15 are connected by a strain body 16. As described later, a plurality of strain sensors (hereinafter referred to as strain gauges) are provided as resistors constituting the bridge circuit, on the surface of the strain body 16.

As described above, in the torque sensor 10 according to the first embodiment, the first strain generation part 14 and the second strain generation part 15 are arranged at positions symmetrical with respect to the center of the first structure 11 and the second structure 12 (i.e., the center of action of the torque), and the strain body 16 which connects the first strain generation part 14 and the second strain generation part 15 is arranged at a center portion of the first structure 11 and the second structure 12.

The first strain generating part 14 and the second strain generating part 15 function as, for example, levers for transmitting strain to the strain body 16. That is, the intermediate portion 14c of the first strain generation part 14 and the intermediate portion 15c of the second strain generation part 15 act as fulcrums, the first end 14a of the first strain generation part 14 and the first end 15a of the second strain generation part 15 act as points of application of force, and the second end 14b of the first strain generation part 14 and the second end 15b of the second strain generation part 15 act as points of action. For this reason, the first strain generation part 14 and the second strain generation part 15 can amplify the torque applied to the first structure 11 and transmit the torque to the strain body 16. That is, the first strain generation part 14 and the second strain generation part 15 amplify the strain generated in accordance with an angle of rotation of the first structure 11 relative to the second structure 12, and transmit the torque to the strain body 16.

All the widths of the first structure 11, the second structure 12, and the plurality of beams 13 may be equal, and the thicknesses of the first portion 11a and the second portion 11b of the first structure 11 and the fifth portion 12a and the sixth portion 12b of the second structure 12 may be larger than the thicknesses of the third portion 11c and the fourth portion 11d of the first structure 11 and the seventh portion 12c and the eighth portion 12d of the second structure 12.

The thickness of the third portion 11c and the fourth portion 11d of the first structure 11 is set to be equal to the thickness of the first strain generation part 14 and the thickness of the seventh portion 12c and the eighth portion 12d of the second structure 12 is set to be equal to the thickness of the second strain generation part 15, but the thicknesses are not limited to these. For example, the width of the third portion 11c and the fourth portion 11d of the first structure 11 may be set to be equal to the width of the first strain generation part 14, the width of the seventh portion 12c and the eighth portion 12d of the second structure 12 may be set to be equal to the width of the second strain generation part 15, the thickness of the third portion 11c and the fourth portion 11d of the first structure 11 may be set to be smaller than the thickness of the first strain generation part 14, and the thickness of the seventh portion 12c and the eighth portion 12d of the second structure 12 may be set to be smaller than the thickness of the second strain generation part 15.

That is, the rigidity of the third portion 11c and the fourth portion 11d of the first structure 11 and the seventh portion 12c and the eighth portion 12d of the second structure 12 needs only to be smaller than the rigidity of the first portion 11a and the second portion 11b of the first structure 11, the fifth portion 12a and the sixth portion 12b of the second structure 12, the first strain generation part 14, and the second strain generation part 15.

Figure 3:
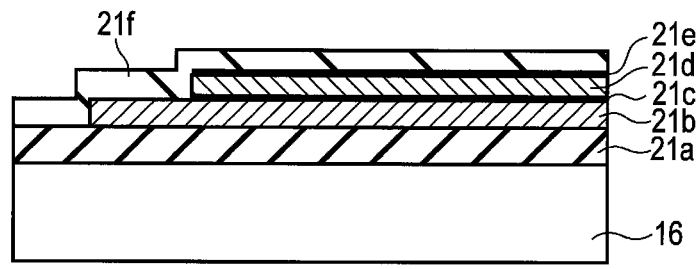
FIG. 3 is a cross-sectional view showing an example of a resistor.

FIG. 3 shows an example of a strain gauge 21 provided at the strain body 16, and shows a cross-section of an end of the strain gage 21. The strain gauge 21 comprises, for example, an insulating film 21a, a thin film resistor (strain sensitive film) 21b, an adhesive film 21c, a wire 21d, an adhesive film 21e, and a glass film 21f serving as a protective film. For example, the insulating film 21a is provided on the strain body 16 formed of metal, and the thin film resistor 21b composed of, for example, a Cr-N resistor is provided on the insulating film 21a. The thin film resistor 21b may have a linear shape, a shape bent at plural times, etc. A wire 21d serving as an electrode lead formed of, for example, copper (Cu) is provided on the end of the thin film resistor 21b via an adhesive film 21c. The adhesive film 21e is provided on the wire 21d. The insulating film 21a, the thin film resistor 21b, and the adhesive film 21e are covered with the glass film 21f. The adhesive film 21c enhances the adhesion between the wiring 21d and the thin film resistor 21b, and the adhesive film 21e enhances the adhesion between the wire 21d and the glass film 21f. The adhesive films 21c and 21e are films containing, for example, chromium (Cr). The configuration of the strain gauge 21 is not limited to this.

Figure 4:
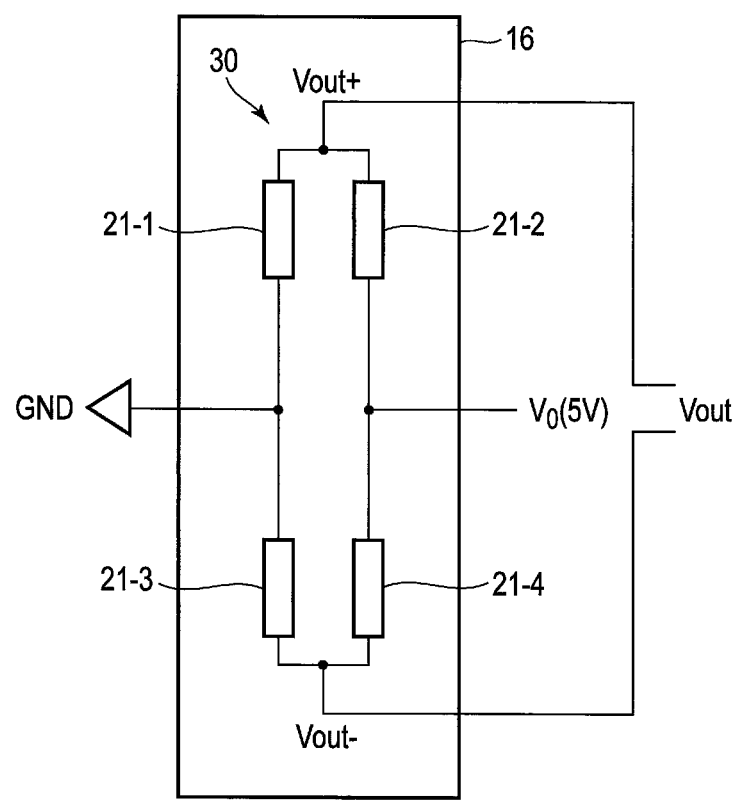
FIG. 4 is a view showing an example of a bridge circuit applied to the torque sensor of the first embodiment.

As shown in FIG. 4, the strain body 16 comprises four strain gauges 21-1, 21-2, 21-3, and 21-4, and a bridge circuit 30 is composed of four strain gauges 21-1, 21-2, 21-3, and 21-4.

The center (center of gravity) of the strain body 16 is arranged at the center of the first structure 11 and the second structure 12, and the strain gauges 21-1 and 21-2 and the strain gauges 21-3 and 21-4 are arranged at positions symmetrical with respect to the center of the first structure 11 and the second structure 12.

In the bridge circuit 30, the strain gauges 21-1 and 21-3 are connected in series, and the strain gauges 21-2 and 21-4 are connected in series. The strain gauges 21-1 and 21-3 connected in series are connected in parallel to the strain gauges 21-2 and 21-4 connected in series. A power source Vo, for example, 5V, is supplied to a connection point of the strain gauges 21-2 and 21-4, and a connection point of the strain gauges 21-1 and 21-3 is, for example, grounded. An output voltage Vout+ is output from a connection point of the strain gauges 21-1 and 21-2, and an output voltage Vout− is output from a connection point of the strain gauges 21-3 and 21-4. An output voltage Vout of the torque sensor 10 represented by equation (1) is obtained from the output voltage Vout+ and the output voltage Vout−.

$$Vout = Vout + - Vout - = (R1/(R1+R2) - R3/(R3+R4)) \cdot Vo \quad (1)$$

where
R1 is a resistance value of the strain gauge 21-1,
R2 is a resistance value of the strain gauge 21-2,
R3 is a resistance value of the strain gauge 21-3,
R4 is a resistance value of the strain gauge 21-4,
and R1=R2=R3=R4=R in a state in which the torque is not applied to the torque sensor 10.

FIG. 5 shows operations in a case where the torque is applied to the torque sensor 10. The torque sensor 10 is provided at, for example, a joint of a robot (not shown). The first structure 11 is attached to, for example, a speed reducer connected to a motor (not shown), and the second structure 12 is attached to a joint.

If the torque is applied to the first structure 11 in a direction of arrow A as illustrated, the first structure 11 is rotated in the direction of arrow A relative to the second structure 12. For this reason, the plurality of beams 13 are elastically deformed. At this time, since the third portion 11c and the fourth portion 11d of the first structure 11 are narrower in width than the first portion 11a and the second portion 11b of the first structure 11 and since the seventh portion 12c and the eighth portion 12d of the second structure 12 are narrower in width than the fifth portion 12a and the sixth portion 12b of the second structure 12, the third portion 11c, the fourth portion 11d, the seventh portion 12c and the eighth portion 12d are elastically deformed more largely than the first portion 11a and the second portion 11b of the first structure 11 and the fifth portion 12a and the sixth portion 12b of the second structure 12.

In the first strain generation part 14 connected to the third portion 11c of the first structure 11 and the seventh portion 12c of the second structure 12, a part between the first end 14a and the intermediate portion 14c is deformed more largely than a part between the intermediate portion 14c and the second end 14b, while, in the second strain generation part 15 connected to the fourth portion 11d of the first structure 11 and the eighth portion 12d of the second structure 12, a part between the first end 15a and the intermediate portion 15c is deformed more largely than a part between the intermediate portion 15c and the second end 15b. By these operations, the second end 14b of the first strain generation part 14 and the second end 15b of the second strain generation part 15 are moved substantially parallel to the X axis in the figure, in directions different from each other.

Strain occurs at the strain body 16 as the second end 14b of the first strain generation part 14 and the second end 15b of the second strain generation part 15 are moved, and the strain is detected by the bridge circuit 30.

The (a) portion of FIG. 6 shows the variation in resistance value of the bridge circuit 30 in a case where the torque is applied to the torque sensor 10, and the (b) portion if FIG. 6 shows the variation in resistance value of the bridge circuit 30 in a case where, for example, the thrust force in the X-axis direction is applied to the torque sensor 10. In FIG. 6, ΔR is the value of variation in the resistance.

FIG. 7 shows results of obtaining the output voltage Vout of the torque sensor 10 under different conditions (1) to (6) from the equation (1).

In FIG. 7,
(1) indicates a case where neither torque nor thrust force is applied to the torque sensor 10.

(2) indicates a case where the torque is applied to the torque sensor 10.

(3) indicates a case where the thrust force is applied to the torque sensor 10.

(4) indicates a case where a temperature variation ΔT is given to the strain gauges 21-1 and 21-2 of the torque sensor 10.

(5) indicates a case where the torque is applied to the torque sensor 10 and the temperature variation ΔT is given to the strain gauges 21-1 and 21-2.

(6) indicates a case where the thrust force is applied to the torque sensor 10 and the temperature variation ΔT is given to the strain gauges 21-1 and 21-2.

In FIG. 7, (1+α·ΔT) indicates the resistance value at the time when the temperature coefficient of resistance is α and the temperature variation is ΔT.

Under each of the conditions represented in (1), (3), (4), and (6), the output voltage Vout of the torque sensor 10 is 0V. That is, when the thrust force is applied to the first structure 11 and the second structure 12, and/or when a temperature variation is applied to the strain gauges 21-1 and 21-2, the thrust force and the temperature variation are canceled and each output voltage Vout of the torque sensor 10 is 0V.

In addition, when the torque is applied to the torque sensor 10 represented in (2), and when the torque is applied to the torque sensor 10 represented in (5) and the temperature variation is given to the strain gauges 21-1 and 21-2, −ΔR/R·Vo is output as the output voltage Vout of the torque sensor 10. The output voltage Vout is a value which does not include temperature coefficient α or temperature change ΔT of the resistance. Therefore, the torque sensor 10 can offset the thrust force and the temperature variation and detect only the torque.

Advantageous Effects of First Embodiment

According to the first embodiment, the first portion 11a and the second portion 11b of the first structure 11 and the fifth portion 12a and the sixth portion 12b of the second structure 12 are connected by the plurality of beams 13. For this reason, allowable torque applied to the torque sensor 10 and the mechanical strength can be set independently by arbitrarily setting the widths and thicknesses of the first portion 11a and the second portion 11b of the first structure 11, the fifth portion 12a and the sixth portion 12b of the second structure 12, and the plurality of beams 13.

In addition, the third portion 11c of the first structure 11 and the seventh portion 12c of the second structure 12 are connected by the first strain generation part 14, the fourth portion 11d of the first structure 11 and the eighth portion 12d of the second structure 12 are connected by the second strain generation part 15, and the first strain generation part 14 and the second strain generation part 15 are connected by a strain body 16 equipped with a bridge circuit 30. For this reason, by arbitrarily setting the width, thickness, and length of the length of the third portion 11c of the first structure 11, the seventh portion 12c of the second structure 12, the first strain generation part 14, the fourth portion 11d of the first structure 11, the eighth portion 12d of the second structure 12, and the second strain generation part 15, and the strain body 16, the sensitivity of the strain gauges 21-1, 21-2, 21-3, and 21-4 can be set independently of the first portion 11a and the second portion 11b of the first structure 11, and the fifth portion 12a and the sixth portion 12b of the second structure 12.

Furthermore, the strain body 16 is composed separately from the first strain generation part 14 and the second strain generation part 15. For this reason, the size and the shape of strain body 16 and the strain gauges 21-1, 21-2, 21-3, and 21-4 can be set independently of the first portion 11a and the second portion 11b of the first structure 11 and the fifth portion 12a and the sixth portion 12b of the second structure 12. Therefore, the area of the strain body 16 and the strain gauges 21-1, 21-2, 21-3, and 21-4 can be made fine.

Furthermore, since the strain body 16 is composed separately from the first strain generation part 14 and the second strain generation part 15, the fine strain gauges 21-1, 21-2, 21-3, and 21-4 can easily be manufactured on the strain body 16.

In addition, the first strain generation part 14 and the second strain generation part 15 are arranged at positions symmetrical with respect to the center of the first structure 11 and the second structure 12 formed in an approximately annular shape, and the strain body 16 which connects the first strain generation part 14 and the second strain generation part 15 is arranged at the center portion of the first structure 11 and the second structure 12. For this reason, the torque can be detected by the single strain body 16.

Furthermore, thrust force and the temperature variation can be offset and the torque alone can be detected by providing the bridge circuit 30 at one strain body 16.

In the first embodiment, the width of the third portion 11c and the fourth portion 11d of the first structure 11 is made smaller than the width of the first portion 11a and the second portion 11b of the first structure 11, and the width is not limited to this but may be equal to the width of the first portion 11a and the second portion 11b. Similarly, the width of the seventh portion 12c and the eighth portion 12d of the second structure 12 is made smaller than the width of the fifth portion 12a and the sixth portion 12b of the second structure 12, and the width is not limited to this but may be equal to the width of the fifth portion 12a and the sixth portion 12b.

In addition, the third portion 11c and the fourth portion 11d of the first structure 11, the seventh portion 12c and the eighth portion 12d of the second structure 12, the first strain generation part 14, and the second strain generation part 15 are formed separately from the first portion 11a and the second portion 11b of the first structure 11 and the fifth portion 12a and the sixth portion 12b of the second structure 12. However, the configuration is not limited to this, but these may be formed integrally.

Second Embodiment

Figure 8:
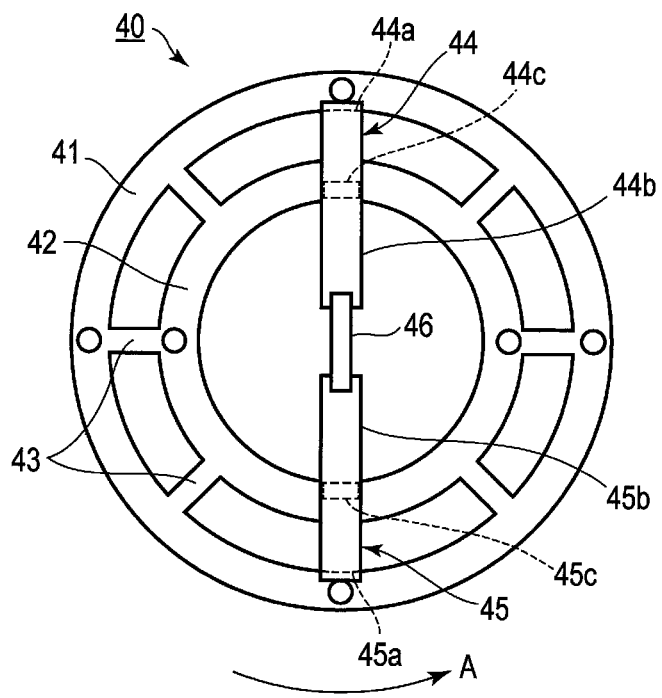
FIG. 8 is a plan view showing a torque sensor according to a second embodiment.
Figure 9:
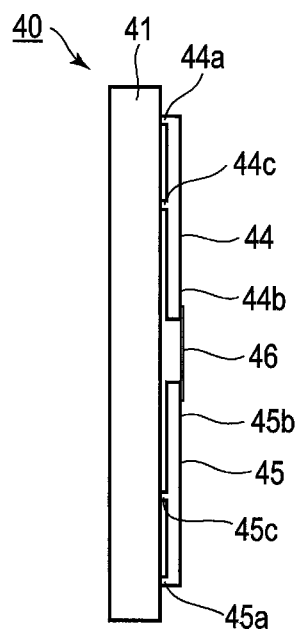
FIG. 9 is a side view of FIG. 8.

FIG. 8 and FIG. 9 show a torque sensor 40 according to the second embodiment.

In the first embodiment, the first structure 11 and the second structure 12 comprise a plurality of portions different in width. In contrast, in the second embodiment, shapes of a first structure and a second structure 12 are simplified.

In FIG. 8 and FIG. 9, a first structure 41 to which the torque is applied and a second structure 42 from which the torque is output are formed in an annular shape, and the second structure 42 is arranged concentrically with the first structure 41. The first structure 41 and the second structure 42 are connected by a plurality of beams 43 which are arranged radially. The widths and the thicknesses of the first structure 41, the second structure 42, and the beams 43 are set to be approximately equal. However, the widths and the thicknesses are not limited to these but the widths and the thicknesses of the first structure 41, the second structure 42, and the beams 43 can be varied in accordance with the allowable torque.

A first strain generation part 44 and a second strain generation part 45 are provided at upper portions of the first structure 41 and the second structure 42. The first strain generation part 44 and the second strain generation part 45 are arranged at positions symmetrical with respect to the center of the first structure 41 and the second structure 42.

More specifically, a first end 44a of the first strain generation part 44 is provided on the first structure 41, the second end 44b is located at an approximately central portion of the second structure 42, and an intermediate portion 44c between the second end 44b and the first end 44a is provided on the second structure 42.

A first end 45a of the second strain generation part 45 is provided on the first structure 41, the second end 45b is located at an approximately central portion of the second structure 42, and an intermediate portion 45c between the second end 45b and the first end 45a is provided on the second structure 42.

The second end 44b of the first strain generation part 44 is opposed to and spaced apart in a predetermined interval from the second end 45b of the second strain generation part 45.

The length between the first end 44a and the intermediate portion 44c and the length between the intermediate portion 44c and the second end 44b, in the first strain generation part 44, are the same as those in the first strain generation part 14 of the first embodiment, and the length between the first end 45a and the intermediate portion 45c and the length between the intermediate portion 45c and the second end 45b, in the second strain generation part 45, are the same as those in the second strain generation part 15 of the first embodiment.

The first strain generation part 44 and the second strain generation part 45 have approximately the same widths as the width of the beams 43. However, the widths of the first strain generation part 44 and the second strain generation part 45 is not limited to this.

The second end 44b of the first strain generation part 44 and the second end 45b of the second strain generation part 45 are connected by a strain body 46. The bridge circuit 30 illustrated in FIG. 4 is formed on the upper surface of the strain body 46, similarly to the first embodiment.

In the torque sensor 40 having the above-described configuration, the first structure 41 is connected to, for example, a speed reducer of a motor provided at a joint of a robot (not shown), and the second structure 42 is connected to a joint portion 51 of the robot as illustrated in FIG. 9. In this state, if the torque is applied to the first structure 41 in a direction of arrow A illustrated in FIG. 8, the first structure 41 is rotated in the direction of arrow A relative to the second structure 42. For this reason, the plurality of beams 43 are elastically deformed. At the same time, the first end 44a of the first strain generation part 44 is rotated in the direction of arrow A with respect to the intermediate portion 44c, and the second end 44b is moved approximately parallel to the X axis. In addition, the first end 45a of the second strain generation part 45 is rotated in the direction of arrow A with respect to the intermediate portion 45c, and the second end 45b is moved approximately parallel to the X axis, in a direction opposite to the second end 44b of the first strain generation part 44.

Strain occurs at the strain body 46 as the second end 44b of the first strain generation part 44 and the second end 45b of the second strain generation part 45 are moved, and the strain is detected by the bridge circuit 30.

The operations of the bridge circuit 30 are the same as those in the first embodiment and, in the second embodiment, too, the thrust force and the temperature variation can be offset and the torque alone can be detected.

Advantageous Effects of Second Embodiment

In the second embodiment, too, the same advantageous effects as those of the first embodiment can be obtained.

Furthermore, in the second embodiment, the first structure 41 and the second structure 42 have the same width, and the plurality of beams 43 have the same width as one another. For this reason, since the configuration of the second embodiment is more simplified than that of the first embodiment, the configuration can easily be manufactured.

In the first embodiment and the second embodiment, the first structures 11 and 41 and the second structures 12 and 42 are arranged concentrically, and the first structures 11 and 41 and the second structures 12 and 42 are connected by the plurality of beams 13 and 43. However, the present invention is not limited to this, but can employ the following configuration.

For example, the first structure and the second structure are formed linearly, the first structure and the second structure are arranged parallel, and the first structure and the second structure are connected by a plurality of beams. Furthermore, a first sensor unit and a second sensor unit are provided at center portions in the longitudinal direction of the first structure and the second structure. The first sensor unit comprises a strain body having a first end connected to the first structure, an intermediate portion connected to the second structure, and a second end extending from the second structure. The second sensor unit has the same configuration as the first sensor unit. The first sensor unit and the second sensor unit are arranged such that a middle part between the second end of the first sensor unit, which serves as a strain generation part, and the second end of the second sensor unit, which serves as a strain generation part, is a center of action of the torque and that the first sensor unit and the second sensor unit are parallel to each other. In this state, the second end of the first sensor unit, which serves as a strain generation part, and the second end of the second sensor unit, which serves as a strain generation part, are connected by a strain body provided with a resistor. That is, the strain body is arranged such that a center portion of the strain body corresponds to the center of action of the torque. In this configuration, too, the same advantageous effects as the above-described embodiment can be obtained.

In addition, the present invention is not limited to the above embodiments as it is, and at the implementation stage, the constituent elements can be modified and embodied without departing from the scope of the invention. In addition, various inventions can be formed by appropriate combinations of a plurality of constituent elements disclosed in the above embodiments. For example, some components may be deleted from all the components shown in the embodiment. Furthermore, components in different embodiments may be combined as appropriate.

What is claimed is:

1. A torque sensor including a first region, a second region, and a plurality of third regions connecting the first region and the second region, a torque to be measured being transmitted between the first region and the second region via the third regions, the torque sensor comprising:

a first strain generation part comprising a first end, a second end, and a first intermediate portion between the first end and the second end, the first end being provided on the first region, the first intermediate portion being provided on the second region;

a second strain generation part comprising a third end, a fourth end, and a second intermediate portion between the third end and the fourth end, the third end being provided on the first region, the second intermediate portion being provided on the second region, the fourth end being opposed and spaced apart from the second end of the first strain generation part; and a strain body connecting the second end of the first strain generation part and the fourth end of the second strain generation part and being provided with a resistor.

2. The torque sensor of claim 1, wherein in the first strain generation part, a length between the first intermediate portion and the second end is longer than a length between the first intermediate portion and the first end and, in the second strain generation part, a length between the second intermediate portion and the fourth end is longer than a length between the second intermediate portion and the third end.

3. The torque sensor of claim 1, wherein the first strain generation part and the second strain generation part are arranged at positions symmetrical with respect to a center of action of the torque in the first region and the second region, and the strain body is arranged at a center of action of the torque in the first region and the second region.

4. The torque sensor of claim 1, wherein the strain body comprises a bridge circuit including a plurality of strain gauges.

5. The torque sensor of claim 1, wherein widths of parts of the first region and the second region, which connect to the third regions, are larger than widths of parts connected to the first strain generation part and the second strain generation part.

6. The torque sensor of claim 1, wherein widths of parts of the first region and the second region, which connect to the third regions, are equal to widths of parts connected to the first strain generation part and the second strain generation part.

* * * * *